SLIDE TRAY INDEXING MECHANISM AND CONTROL THEREFOR

Original Filed May 8, 1964 2 Sheets-Sheet 1

HERBERT T. ROBINSON
MATTHEW DI PIETRO
INVENTORS
BY R. Frank Smith
Steve W. Humber
ATTORNEYS

SLIDE TRAY INDEXING MECHANISM AND CONTROL THEREFOR

Original Filed May 8, 1964 2 Sheets-Sheet 2

HERBERT T. ROBINSON
MATTHEW DI PIETRO
INVENTORS

BY R. Frank Smith
Stan W. Sambar
ATTORNEYS

United States Patent Office

Re. 26,789
Reissued Feb. 10, 1970

26,789

SLIDE TRAY INDEXING MECHANISM AND CONTROL THEREFOR

Herbert T. Robinson, Rochester, and Matthew Di Pietro, Webster, N.Y., assignors to Eastman Kodak Company, Rochester, N.Y., a corporation of New Jersey Original No. 3,236,113, dated Feb. 22, 1966, Ser. No. 366,034, May 8, 1964. Application for reissue Mar. 4, 1969, Ser. No. 807,458

Int. Cl. G03b *1/40;* F16h *27/02*

U.S. Cl. 74—125.5 16 Claims

Matter enclosed in heavy brackets [ ] appears in the original patent but forms no part of this reissue specification; matter printed in italics indicates the additions made by reissue.

*ABSTRACT OF THE DISCLOSURE*

*A slide tray indexing mechanism for a slide projector having spaced projections includes a plate slidably and pivotally supported on a base and having a rib which is interposed between the projections of the slide tray when the plate is moved in one direction. After the rib is between the projections, its direction of movement is changed to move the tray in a forward or reverse direction by selectively moving a stop into the path of one or another part of the plate. The indexing mechanism further includes a clutch control system having a member biased towards a declutching position, an electromagnet for moving the member to a clutch-disengaging position and a switch when closed to electrically connect the clutch, the member and the electromagnet in series so that the circuit is broken when the electromagnet is energized to disengage the clutch.*

This invention relates generally to slide projectors, and more specifically to an improved slide tray indexing mechanism and control therefor for moving a slide tray in forward and reverse directions.

The improved slidetray indexing mechanism of this invention is particularly adapted for use in an automatic slide projector of the type disclosed in U.S. application Serial No. 175,216, filed on February 23, 1962, by one of the present co-inventors, Herbert T. Robinson.

One of the objects of the present invention is to provide an improved slide tray indexing mechanism for moving a slide tray in forward and reverse directions.

Another object of the invention is to provide an improved control system for a slide tray indexing mechanism.

Another object of the invention is to provide an improved slide tray indexing mechanism and control therefor that selectively clutches the indexing mechanism to a drive system and determines the direction in which the indexing mechanism moves the slide tray.

Another object of the invention is to provide an imporved slide tray indexing mechanism and control therefor that is more compact, so as to require less space, than prior known indexing mechanisms and controls.

Another object of the invention is to provide an improved control system for a slide tray indexing mechanism that is quieter in operation than prior known control systems.

Another object of the invention is to provide an improved slide tray indexing mechanism and control therefor that is of simple design and construction, thoroughly reliable and efficient in operation, and economical to manufacture.

Objects and advantages other than those set forth above will be apparent from the following description when read in connection with the accompanying drawings, in which.

Figure 1:
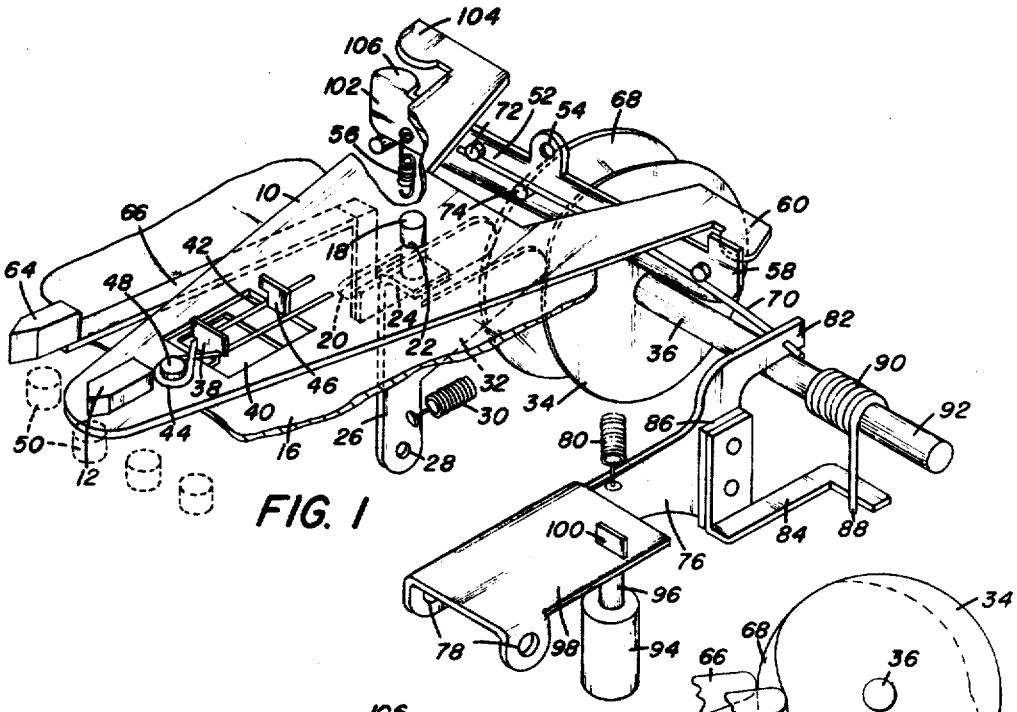
FIG. 1 is a schematic view in perspective of a slide tray indexing mechanism and control therefor shown in its normal inoperative position, and constructed in accordance with a preferred embodiment of this invention.
Figure 2:
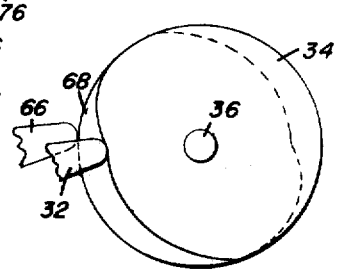
FIG. 2 is a side elevation view of the indexing and locking cams of FIG. 1.

Referring to the drawings, a preferred embodiment of a slide tray indexing mechanism and control therefor according to the present invention is disclosed for use in an automatic slide projector of the type shown and described in the aforementioned U.S. patent application. Applicants have limited their drawings to the inventive features involved, and many parts of the slide projector ancillary thereto, and which are shown and described in the aforementioned application, have been omitted for purposes of clarity.

Figure 8:
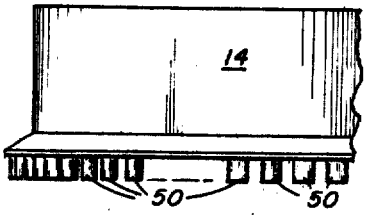
FIG. 8 is a segmental, side elevation view of a portion of a slide tray.

The slide tray engaging and indexing mechanism comprises a pie-shaped plate 10 havin a rib 12 secured to one end thereof for moving a slide tray 14, see FIG. 8, in a manner to be explained hereinafter. The plate 10 rests on a wall 16 of a housing, and is slidably movable thereon from and to a normal inoperative or initial position by a pin 18 extending through an elongated opening 20 shown dotted in wall 16, and a round opening 22 in plate 10. The pin 18 is secured to a tab 24 of a lever 26 pivoted at 28 and biased by a spring 30 in a clockwise direction. The lever 26 further has an arm 32 the end of which forms a cam follower for engaging the periphery of a cam 34 mounted on a driven shaft 36. The plate 10 is guided in its movement on wall 16 by elongated slot 20 which guides pin 18, and by a lug 38 on wall 16 extending through an opening 40 in plate 10, and through the elongated arms 42 of a spring 44 bearing on the sides of a lug 46 of plate 10. The intermediate portion of spring 44 is wound around a lug 48 on plate 10 so that arms 42 are biased against the sides of lugs 38, 46. Although this is accomplished by one spring, it is obvious that two separate springs could be employed. Since elongated slot 20, and arms 42 of spring 44, when in engagement with lugs 38, 46, are parallel, the plate 10 is constrained for movement along a straight path parallel thereto. It is readily apparent that such movement of plate 10, if unaltered, would merely move rib 12 back and forth between two succeeding pins 50 on slide tray 14, and would fail to move the slide tray in either the forward or reverse direction.

To alter movement of plate 10 from the above-described straight path to achieve forward and reverse indexing of slide tray 14, a lever 52 is provided pivoted at 54. The lever 52 is biased by a spring 56 in a counterclockwise direction into a "forward indexing" position (see FIG. 3), with a portion thereof engaging wall 16 to provide a stop. In this "forward indexing" position of lever 52, one end 58 thereof extends into the path of a laterally extending arm 60 on plate 10 to form a stop therefor. Accordingly, when shaft 36 and cam 34 are rotated by a drive motor 62 through a single revolution, lever 26 and pin 18 advance plate 10 along the aforementioned straight path causing rib 12 to move into an operative position between two succeeding pins 50 of slide tray 14. Continued movement of plate 10 by pin 18 causes arm 60 to initially engage lever end 58, and plate 10 to then rock or pivot in a counterclockwise direction around pin 18 and slidably along lever end 58 acting as a fulcrum. This pivotal movement of plate 10 causes rib 12 to engage a pin 50 and move tray 14 in a forward direction (see arrow in FIG. 3) a distance equal to one slide compartment for bringing another slide in tray 14 into register with the projection gate, not shown. Immediately after tray 14 is advanced, a tray locking projection 64 on a sliding lever 66 is moved by a cam 68, also mounted on shaft 36, between two other adjacent pins 50 on tray 14 to releasably lock the tray in its new position.

Figure 6:
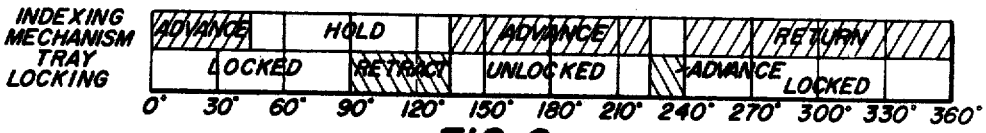
FIG. 6 is a graph showing the relationships between the indexing and tray locking mechanisms for one complete cycle of operation.

The purpose of the tray locking mechanism is to locate or position slide tray 14 so that a tray compartment is in alignment with the projection gate, not shown, and to hold the tray in this position until it is to be indexed to a new position. The relationship between the tray locking and indexing mechanisms is best shown in FIG. 6 where it can be seen that in the normal inoperative or initial position of the indexing mechanism, tray 14 is locked by projection 64. The tray 14 remains locked while plate 10 is advanced along its straight path to a hold position where arm 60 is about to engage lever end 58, and projection 64 is retracted to its unlocked position prior to continued pivotal movement of plate 10 for advancing tray 14. The projection 64 again locks tray 14 as plate 10 is returned to its normal inoperative position. The action of the locating or locking projection 64 is described in detail in the aforementioned U.S. application, and hence is only disclosed in sufficient detail in this application to show its interrelationship with the indexing mechanism.

Figure 4:
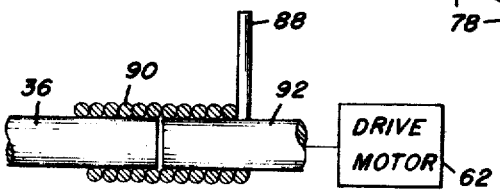
FIG. 4 is a segmental view partly in section of the clutch and motor drive system.

The mechanism for moving plate 10 and rib 122 in the proper direction to move slide tray 14 in a reverse direction will now be described. To this end, lever 52 has a spring 70, one end bearing on the underside of a lug 72 on lever 52, and an intermediate portion thereof bearing on the top of a lug 74 on lever 52. A lever 76 pivoted at 78 and biased by a spring 80 into a normal inoperative position has an arm 82 through which the free end of spring 70 extends. An arm 84 is secured to lever 76, but is spaced therefrom by a means of an electrical insulating pad 86 or strip, and the end of arm 84 cooperates with the free end 88 of a helical clutch spring 90 (see FIGS. 1 and 4) for clutching or declutching a continuously driven shaft 92 to shaft 36.

The helical clutch spring 90 is of a well known type, and is not disclosed in further detail herein since a similar clutch is disclosed in detail in U.S. Patent No. 2,969,711. It will suffice here to say that when free end 88 of spring 90 is held stationary by the end of arm 84, the coils of spring 90 are enlarged so that shaft 36 is not driven. On the other hand, when the spring end 88 is released, the spring 90 constricts connecting the constantly rotating drive shaft 92 to shaft 36 for driving same.

Figure 3:
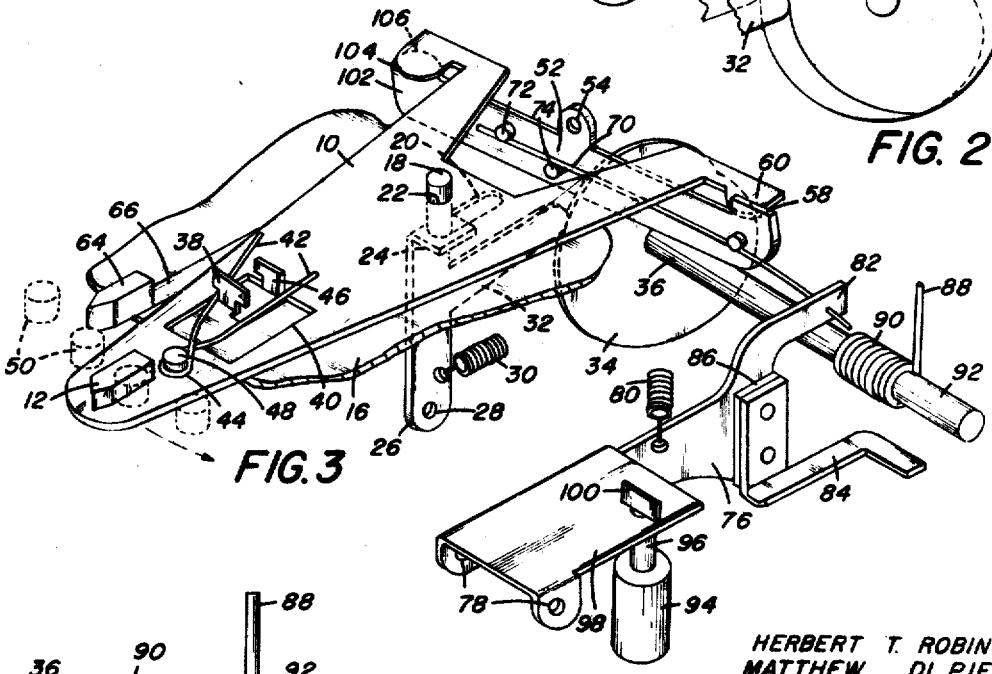
FIG. 3 is a view similar to FIG. 1 showing the mechanism in its forward indexing position.
Figure 5:
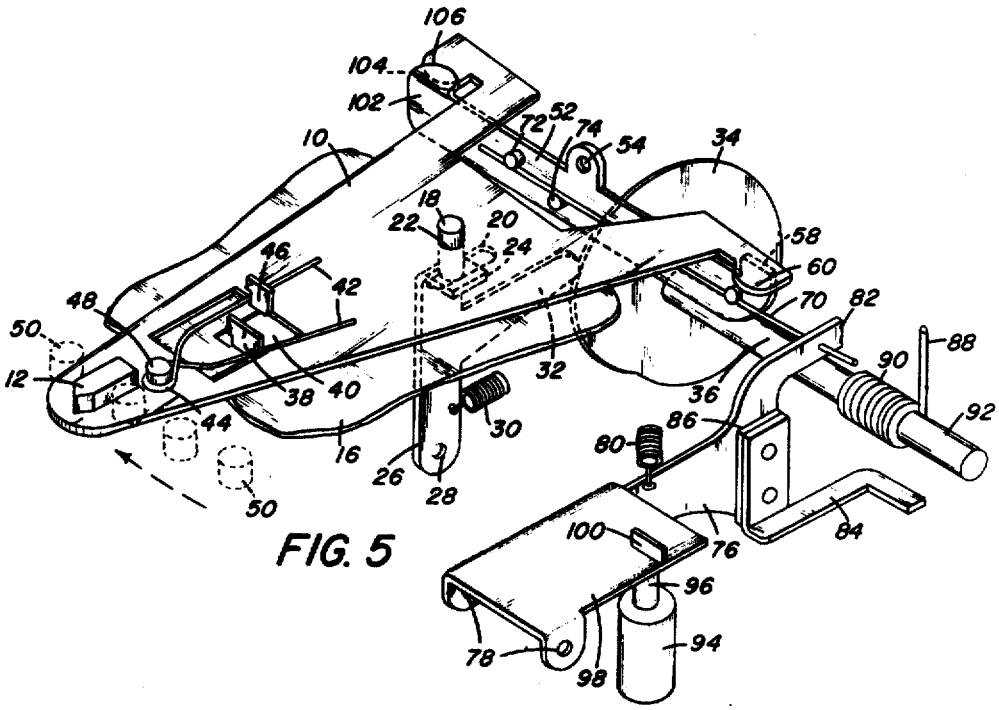
FIG. 5 is a view similar to FIGS. 1 and 3 showing the mechanism in its reverse indexing position.

The release of spring end 88 is controlled by pivotal movement of lever 76 under the action of an electromagnet 94, the movable core 96 of which is secured to a flange 98 of lever 76 by a head 100. Energization of electromagnet 94, pivotally moves lever 76 in a clockwise direction against the bias of spring 80. In addition, movement of lever 76 by electromagnet 94 urges lever 52 in a clockwise direction by virtue of the spring 70 and arm 82 connection withdrawing lever end 58 from the path of arm 60, and inserting the opposite end 102 of lever 52 in the path of arm 104 on plate 10 extending from the base of plate 10 in the opposite direction of arm 60 as best seen in FIGS. 1, 3 and 5. Accordingly, upon rotation of cam 34, plate 10 is moved in a forward direction in its normal path to its operative position in which rib 12 is interposed in the space between adjacent pins 50 on slide tray 14. Shortly thereafter, arm 104 engages lever end 102, and upon continued movement of cam 34, cam follower 32, lever 26 and pin 18, pivots plate 10 in a clockwise direction about pin 18 and slidably along lever end 102 acting as a fulcrum causing rib 12 to engage pin 50 and move slide tray 14 the distance of one slide compartment in a reverse direction. The plate 10 is then returned to its original "forward indexing" position. As indicated earlier, during the indexing operations, the aforementioned locking projection 64 is timed to move between two adjacent pins 50 on slide tray 14 immediately after the slide tray has been moved a distance of one slide compartment in either the forward or reverse direction, and is withdrawn from between pins 50 substantially simultaneously with the insertion of rib 12 between two other adjacent pins 50 of slide tray 14.

In order to assure that lever end 102 is in engagement with arm 104 of plate 10 for a sufficient period of time to accomplish the reversing operation, lever end 102 has a lip 106 thereon which engages the upper surface of arm 104 when solenoid 94 is de-energized preventing spring 56 from returning lever 52 to its normal "forward indexing" position, in which lever end 102 is out of the path of arm 104. Naturally, when plate 10 is returned to its normal inoperative position by lever 26, arm 104 is withdrawn from its position underneath lip 106 permitting spring 56 to return lever 52 to its normal "forward indexing" position.

Figure 7:
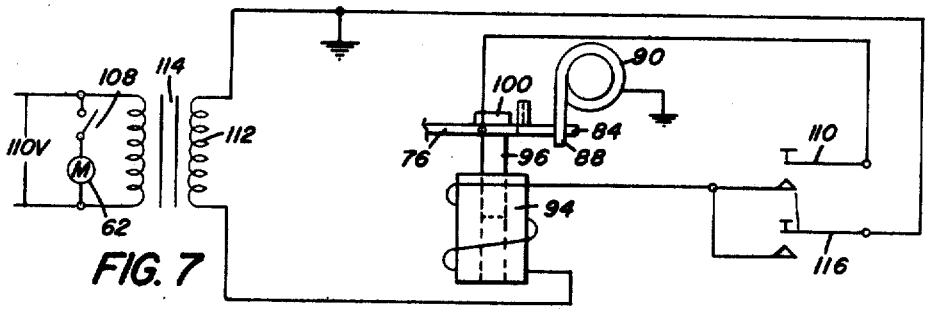
FIG. 7 is a schematic wiring diagram for the indexing mechanism.

Since lever 52 is pivoted to its "reverse indexing" position upon energization of electromagnet 94, it is imperative for forward operation of the slide tray indexing mechanism that lever 52 be returned to its normal "forward indexing" position before arm 104 passes under lip 106. On the other hand, for reverse operation of the indexing mechanism, it is desirable to energize electromagnet 94 for a longer period of time in order to hold lever 52 in its "reverse indexing" position for a sufficient period of time to enable arm 104 to move under lip 106 for releasably holding lever 52 in this position. Both of these conditions are fulfilled by applicants' improved electrical-mechanical control mechanism as shown in FIG. 7 of the drawing. In the circuit, the slide projector "on-off" switch 108 is connected in series with drive motor 62. A "forward" switch 110 controlling operation of the indexing mechanism to advance tray 14 in a forward direction is connected in circuit with secondary 112 of a transformer 114, electromagnet 94, arm 84, and clutch spring 90 which is connected to ground. A "reverse" switch 116, on the other hand, is connected in circuit with secondary 112 of transformer 114, and electromagnet 94. Accordingly, when "forward" switch 110 is closed, electromagnet 94 is energized moving lever 76 in a clockwise direction withdrawing arm 84 from in front of spring end 88 for releasing same. As soon as spring end 88 is released, the electrical circuit is broken deenergizing electromagnet 94 whereupon spring 80 immediately returns lever 76 to its normal inoperative position as seen in FIG. 1. This action takes place so rapidly that lever 52, which had been moved in a clockwise direction by lever 76, is returned to its normal "forward indexing" position with its lever end 58 in the path of arm 60 before plate 10 has been advanced a sufficient distance to move arm 60 into engagement therewith. In this circuit, arm 84 and clutch spring end 88 function as a switch. In addition, since electromagnet 94 is deenergized before movable core 96 has an opportunity to bottom on its stop, which may be the upper end 118 of electromagnet 94, quieter electromagnet operation is achieved. When "reverse" switch 116 is closed, electromagnet 94 is energized releasing clutch 90, and the electromagnet continues to be energized as long as "reverse" switch 116 is held in its closed position. The usual period of time that an operator keeps switch 116 closed is normally sufficient to permit arm 104 to move under lip 106. A mechanical detent, not shown, may be added to "reverse" switch 116 to insure holding it in a closed position for a sufficient period of time to permit arm 104 to move under lip 106.

The invention has been described in detail with particular reference to a preferred embodiment thereof, but it will be understood that variations and modifications can be effected in the scope of the invention described hereinabove, and as defined in the patent claims.

We claim:

1. In an improved *slide projector* slide tray indexing mechanism [for a slide projector], the combination comprising:

means for engaging and indexing said slide tray in forward and reverse directions along a *first* path;

means for reciprocally moving said engaging and indexing means *along a second path* from an initial position in a direction transverse to said forward and reverse directions to an operative position in which said engaging and indexing means extends into said *first* path, *said second path being substantially the same for both forward and reverse indexing of said slide tray;* and means cooperating with said engaging and indexing means after said engaging and indexing means is moved into its operative position for changing the direction of movement of said engaging and indexing means to a direction generally conforming to one of said forward and reverse directions whereby said engaging and indexing means engages said slide tray and indexes it in one of said forward and reverse directions.

2. In an improved indexing mechanism for a slide tray having spaced apart projections, the combination comprising:

means for engaging one of said projections and indexing said slide tray in forward and reverse directions, *wherein said indexing means comprises a slidably mounted plate which is supported on a base*;

means for reciprocally moving said engaging and indexing means from an initial position in a direction transverse to said forward and reverse directions into an operative position in which a portion of said engaging and indexing means is interposed between said projections, *said portion comprising a rib and said moving means comprising a pin extending through an elongated slot in said base and forming a pivot for said plate*; and means cooperating with said engaging and indexing means after said engaging and indexing means is moved into its operative position for changing the direction of movement of said engaging and indexing means to a direction generally conforming to one of said forward and reverse directions whereby said portion engages one of said projections for moving said tray in one of said forward and reverse directions.

[3. The invention according to claim 2 wherein said indexing means comprises a slidably mounted plate, and said portion comprises a rib.]

[4. The invention according to claim 3 wherein said plate is supported on a base, and said moving means comprises a pin extending through an elongated slot in said base and forming a pivot for said plate.]

5. The invention according to claim [4] *2* wherein said plate is constrained for movement in said direction transverse to said forward and reverse directions by said elongated slot within which said pin is guided, and a pair of elongated spring arms mounted on said plate and engaging opposite sides of a lug on said base.

6. [The invention according to claim 2] *In an improved indexing mechanism for a slide tray having spaced apart projections, the combination comprising:*

*means for engaging one of said projections and indexing said slide tray in forward and reverse directions;*

*means for reciprocally moving said engaging and indexing means from an initial position in a direction transverse to said forward and reverse directions into an operative position in which a portion of said engaging and indexing means is interposed between said projections; and*

*means cooperating with said engaging and indexing means after said engaging and indexing means is moved into its operative position for changing the direction of movement of said engaging and indexing means to a direction generally conforming to one of said forward and reverse directions* wherein said direction changing means for said indexing means comprises a stop means movable into and out of the path of a part of said indexing means, and about which said indexing means is pivoted in one direction upon continued movement of said index means for moving said tray in one of said forward and reverse directions *whereby said portion engages one of said projections for moving said tray in one of said forward and reverse directions.*

7. The invention according to claim 6 wherein a second stop means is provided which is movable into and out of the path of a second part of said indexing means and about which said indexing means is pivoted in the opposite direction for moving said tary in the other of said forward and reverse directions.

8. The invention according to claim 6 wherein said stop means comprises a first pivotal lever having a flange movable into and out of the path of said part of said indexing means, a spring secured to said lever, and means connected to said spring for moving said lever.

9. The invention according to claim 8 wherein said lever moving means comprises a second pivotal lever connected to said spring, and a solenoid for moving said second lever to and from an initial position.

10. The invention according to claim 6 wherein said moving means for said indexing means compirses a rotatable cam, a pivotal member having one arm connected to said indexing means and a cam follower engaging the periphery of said cam, a drive means, a clutch means interconnecting said cam and drive means, and a control means for said clutch to limit rotation of said cam to a single revolution.

11. The invention according to claim 10 wherein said clutch means comprises a helical spring having a free end, and said control means comprises a member movable between a normal blocking position in which it blocks said free end and said clutch disconnects said cam from said drive means, and an unblocking position in which said free end is released and said clutch drivingly connects said drive means to said cam, a solenoid connected to said member and adapted when energized to move said member to its unblocking position, a power supply, and a switch adapted when closed to electrically connect said member, spring and solenoid in series circuit with said power supply whereby said solenoid is energized for moving said member to its unblocking position, said movement of said member releasing said free end of said spring to break the electrical circuit and deenergize said solenoid.

12. In an improved electrical-mechanical clutch control system for drivingly connecting and disconnecting driving and driven members, the combination comprising:

a clutch iterposed between said driving and driven members, and operable in a clutching condition to drivingly connect said members, and in a declutching condition to disconnect said members;

a clutch control member biased into a normal inoperative position in which it engages said clutch and holds it in its declutching condition, and movable therefrom to an operative position in which it disengages said clutch to place it in its clutching condition;

an electromagnet connected to said clutch control member and adapted when energized to move said member against its bias to its operative position;

a power supply; and a switch adapted when closed to electrically connect said clutch, clutch control member and electromagnet in series circuit relationship with said power supply whereby said electromagnet is energized for moving said member to its operative position, said member during its movement disengaging said clutch and breaking said circuit whereby said electromagnet is deenergized and said member returned to its normal inoperative position.

13. In an improved electrical-mechanical clutch control system for drivingly connecting and disconnecting driving and driven members, the combination comprising:

a movable clutch element interposed between said driving and driven members and disconnecting said members when blocked, and drivingly connecting said members when unblocked;

a blocking member biased into a normal blocking position in which it blocks said clutch element, and movable therefrom to an unblocking position in which it releases said clutch element;

an electromagnet connected to said blocking member and adapted when energized to move said blocking member to its unblocking position;

a power supply; and a switch adapted when closed to electrically connect said blocking member, clutch element and electromagnet in series circuit with said power supply whereby said electromagnet is energized for moving said member to its unblocking position, said member during its movement releasing said clutch element and breaking said circuit whereby said electromagnet is deenergized and said member returned to its blocking position.

14. The invention according to claim 13 wherein said movable clutch element comprises a helical spring having a free end cooperating with said movable member.

*15. In an improved indexing mechanism for a slide tray having spaced apart projections, the combination comprising:*

*means for engaging one of said projections and indexing said slide tray in forward and reverse directions, said means including a base having an elongated slot therein, a plate slidably and pivotally mounted on said base, and a rib on said plate;*

*means for reciprocally moving said engaging and indexing means for an initial position in a direction transverse to said forward and reverse directions into an operative position in which said rib is interposed between said projections, said moving means comprising a pin carried by said plate and extending through said elongated slot in said base to form a pivot for said plate; and*

*means cooperating with said engaging and indexing means after said engaging and indexing means is moved into its operative position for changing the direction of movement of said engaging and indexing means to a direction generally conforming to one of said forward and reverse directions whereby said rib engages one of said projections for moving said tray in one of said forward and reverse directions.*

*16. In an improved slide projector slide tray indexing mechanism, the combination comprising:*

*means for engaging and indexing said slide tray in forward and reverse directions along a first path;*

*means movable along a second path in a direction transverse to said forward and reverse directions for reciprocally moving said engaging and indexing means from an initial position in a direction transverse to said forward and reverse directions to an operative position in which said engaging and indexing means extends into said first path, said second path being substantially colinear for both forward and reverse indexing of said slide tray; and*

*means cooperating with said engaging and indexing means after said engaging and indexing means is moved into its operative position for changing the direction of movement of said engaging and indexing means to a direction generally conforming to one of said forward and reverse directions whereby said engaging and indexing means engages said slide tray and indexes it in one of said forward and reverse directions.*

*17. In an improved mechanism for indexing a slide tray in forward and reverse directions along an indexing path, the tray having spaced apart projections, said combination comprising:*

*support means;*

*a plate mounted on said support means for both linear and pivotal movement;*

*means carried by said plate for engaging at least one of said projections;*

*means for moving said plate in a direction transverse to said indexing path between a first position wherein said engaging means is spaced from said path and a second position wherein said engaging means assumes a position between projections;*

*first means selectively engageable with a portion of said plate as said engaging means moves into its position between projections for pivoting said plate to move said engaging means into forwardly indexing engagement with one of said projections to forwardly index said tray;*

*second means selectively engageable with a portion of said plate as said engaging means moves into its position between projections to pivot said plate to move said engaging means into reverse indexing engagement with one of said projections to reversely index said tray; and*

*means for selecting between engagement of said plate by said first and said second means.*

*18. In an improved mechanism for indexing a slide tray in forward and reverse directions along an indexing path, said tray having spaced apart projections, the combination comprising:*

*a linearly and pivotally movable palte;*

*means carried by said plate for engaging at least one of said projections;*

*means for moving said plate linearly in a direction for moving said engaging means from a position spaced from said indexing path to a position between said projections;*

*first stop means selectively engageable with a portion of said plate for stopping linear movement of said portion, but permitting pivotal movement in response to said moving means to pivot said plate to move said engaging means into forwardly indexing engagement with one of said projections to forwardly index said tray;*

*said second stop means selectively engageable with a second portion of said plate for stopping linear movement of said portion, but permitting pivotal movement in response to said moving means to pivot said plate to move said engaging means into reversely indexing engagement with one of said projections to reversely index the tray; and*

*means for selecting between engagement of one said portion by said said first and second stop means.*

References Cited

The following references, cited by the Examiner, are of record in the patented file of this patent or the original patent.

UNITED STATES PATENTS

| | | | |
|---|---|---|---|
| 2,675,710 | 4/1954 | Ruhland | 192—41 |
| 2,503,239 | 4/1950 | Antos | 353—104 |

(Other references on following page)

UNITED STATES PATENTS

| | | | |
|---|---|---|---|
| 2,523,772 | 9/1950 | McGibbon et al. | 192—41 |
| 2,741,927 | 4/1956 | Hollander | 254—167 |
| 2,732,178 | 1/1956 | Chaney | 254—167 |
| 2,768,826 | 10/1956 | Gaite | 74—111 |
| 2,969,711 | 1/1961 | Robinson et al. | 88—28 |
| 3,044,676 | 7/1962 | Townsley | 74—166 X |

FOREIGN PATENTS

| | | |
|---|---|---|
| 646,678 | 3/1961 | Italy. |
| 897,399 | 5/1962 | Great Britain. |

MARK M. NEWMAN, Primary Examiner

W. S. RATLIFF, Jr., Assistant Examiner

U.S. Cl. X.R.

353—103

PO-1050
(5/69)

UNITED STATES PATENT OFFICE
CERTIFICATE OF CORRECTION

Patent No. Re 26,789 Dated February 10, 1970

Inventor(s) Herbert T. Robinson and Matthew DiPietro

It is certified that error appears in the above-identified patent and that said Letters Patent are hereby corrected as shown below:

Column 3, line 37, change "122" to "12".

Column 5, line 16, change "index" to "indexing".

Column 6, line 25, change "tary" to "tray".

Column 8, line 64, change "portion" to "portions".

SIGNED AND
SEALED
JUL 21 1970

(SEAL)
Attest:

Edward M. Fletcher, Jr.
Attesting Officer

WILLIAM E. SCHUYLER, JR.
Commissioner of Patents